United States Patent
Atay

(10) Patent No.: US 10,990,891 B1
(45) Date of Patent: Apr. 27, 2021

(54) PREDICTIVE MODELING FOR AGGREGATED METRICS

(71) Applicant: Amazon Technologies, Inc., Seattle, WA (US)

(72) Inventor: Hasan Nuzhet Atay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 873 days.

(21) Appl. No.: 15/698,517

(22) Filed: Sep. 7, 2017

(51) Int. Cl.
  *G06N 7/02* (2006.01)
  *G06F 17/11* (2006.01)
  *G06N 20/00* (2019.01)

(52) U.S. Cl.
  CPC .............. *G06N 7/02* (2013.01); *G06F 17/11* (2013.01); *G06N 20/00* (2019.01)

(58) Field of Classification Search
  CPC .......... G06N 7/02; G06N 20/00; G06F 17/11
  See application file for complete search history.

(56) References Cited

U.S. PATENT DOCUMENTS

| | | | | |
|---|---|---|---|---|
| 10,177,998 | B2* | 1/2019 | Parandehgheibi | ...... H04L 47/31 |
| 10,635,563 | B2* | 4/2020 | Salunke | ................... G06F 11/00 |
| 2015/0317197 | A1* | 11/2015 | Blair | ..................... H04L 41/147 |
| | | | | 714/47.3 |
| 2017/0310546 | A1* | 10/2017 | Nair | ..................... H04L 41/0654 |
| 2020/0134489 | A1* | 4/2020 | Achin | .................... G06N 20/00 |

\* cited by examiner

*Primary Examiner* — Alan Chen
(74) *Attorney, Agent, or Firm* — Davis Wright Tremaine LLP

(57) ABSTRACT

A computing resource monitoring service obtains access to aggregated metrics data from computing resources of a computing resource service provider. The computing resource monitoring service may then generate a predictive model based at least in part on the aggregated metrics. The predictive model may then be used to generate a prediction associated with the computing resource and, based at least in part on the prediction, one or more alarms may be triggered. The alarm may be triggered based at least in part on a confidence interval determined based at least in part on the prediction.

20 Claims, 9 Drawing Sheets

PREDICTIVE MODELING FOR AGGREGATED METRICS

BACKGROUND

Organizations invest in technologies that provide customers with access to computing resources through services. Such services provide access to computing and/or storage resources (e.g., storage devices providing either a block-level device interface or a web service interface) to customers. Within multi-tier ecommerce systems, combinations of different types of resources may be allocated to customers and/or their applications, such as whole physical or virtual machines, CPUs, memory, network bandwidth, or I/O capacity. For example, block-level storage devices implemented by a storage service may be made accessible from one or more physical or virtual machines implemented by another service. To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner. In such large distributed computing system (e.g., multiple distributed data centers) of a computing resource service provider, various customers, users, services, and resources of the computing resource service provider frequently generate large amount of metrics data. For example, a single customer's virtual computing resources may produce millions of lines of log data in a single day or even a single hour. This log data may contain useful information for troubleshooting, diagnosing, and detecting issues and anomalies within these large distributed computing systems.

Customers and administrators of a computing resource service provider, as well as other users of computing resources of the computing resource service provider often utilize monitoring services to measure, diagnose, and improve how they operate their computing resources. For instance, through these monitoring services, customers, administrators, and other users can obtain data, such as log data, from their computing resources and use this data to determine whether their computing resources are functioning properly. If their computing resources are not functioning properly, the data can be used to identify and enable customers, administrators, and other users to troubleshoot any issues that may be present. However, monitoring services often process a significant volume of data over time resulting in a need to examine large amounts of data to detect and diagnose any issues. Conventional techniques for monitoring computing resources often result in significant latencies between when data indicative of an issue is obtained and when issues and/or solutions are identified in the data. Customers, administrators, and other users may wish to identify and troubleshoot issues sooner to determine whether an adjustment to the way their resources are operating is needed. However, most techniques utilized to reduce latency can result in inefficiencies and substantially higher infrastructure costs.

BRIEF DESCRIPTION OF THE DRAWINGS

Various techniques will be described with reference to the drawings, in which.

DETAILED DESCRIPTION

Figure 1:
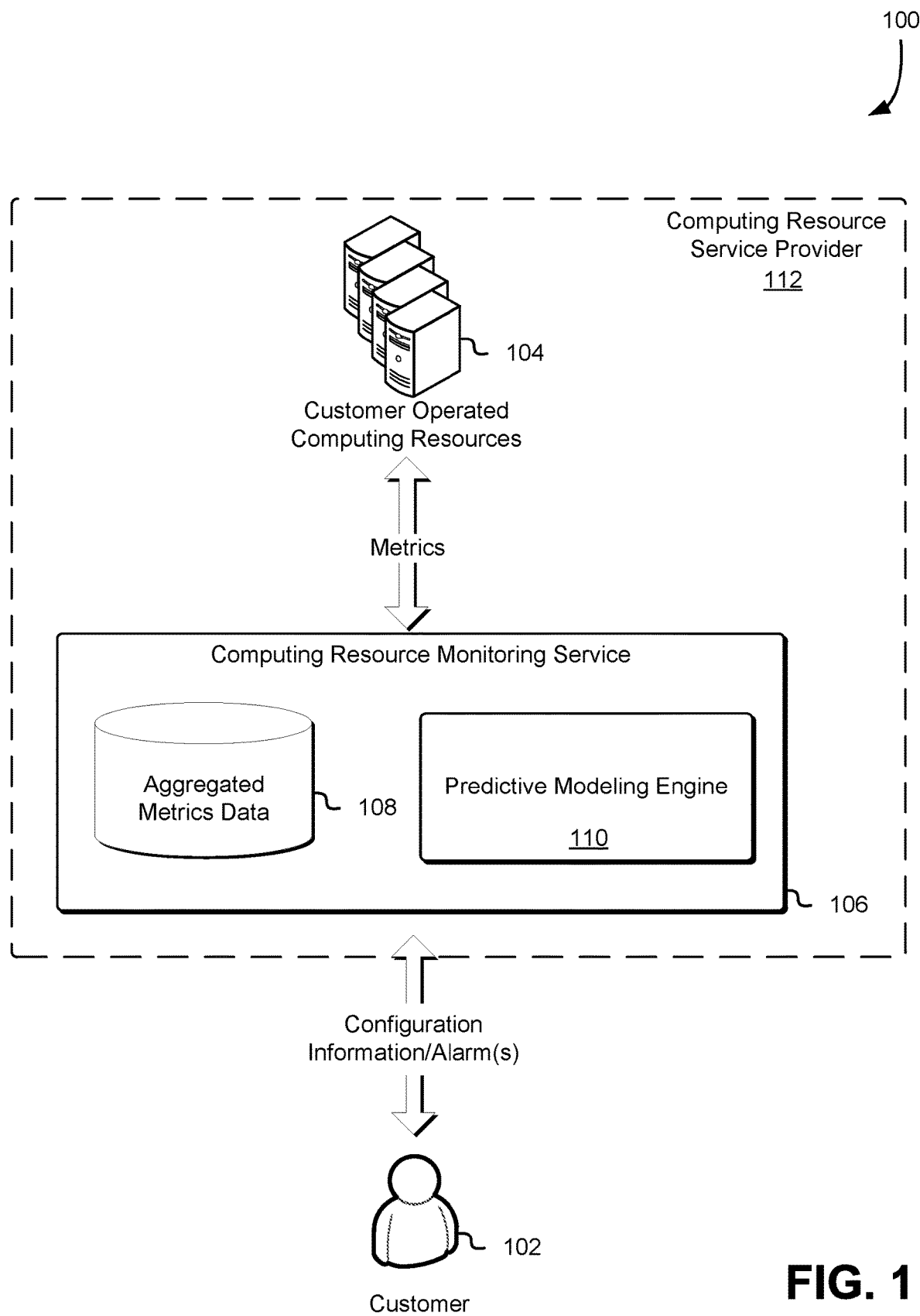
FIG. 1 illustrates an environment in which a predictive modeling engine of a computing resource monitoring service obtains aggregated metrics and generates predictions on behalf of a customer in accordance with an embodiment.

In various examples describe below, a computing resource monitoring service provided by a computing resource service provider collects and aggregates metrics data from a plurality of computing resources operated by customers of the computing resource service provider. For example, logs generated by one or more computing resources are collected, processed, and analyzed using a predictive modeling engine implementing one or more predictive modeling algorithm described in greater detail below. The predictive modeling engine, in various embodiments, is a component of the computing resource monitoring service offered to customers of the computing resource service provider. Results of the predictive modeling engine are generated and provided to various customers or other endpoint (e.g., storage location, data stream, messaging service).

In various embodiments, the aggregated metrics include time-series or other data indicating a set of events occurring over an interval of time. In some examples example, the aggregated metrics data includes CPU usage over an interval of time, network connections over an interval of time, orders received at an electronic marketplace over an interval of time, or any other data collected, processed, and/or generated by a computing resource over an interval of time. Additionally, with the increased use of large distributed computer systems and virtualization, the size and quantity of metrics data is increasing with the proliferation of services provided by computing resource service providers. This metrics data may include records of events occurring during the execution of distributed computer systems to provide diagnostic information, performance information, an audit trail, or similar information that can be used to understand the activities of these distributed computer systems as well as detect and diagnose problems and other anomalies. The predictive modeling engine described in the present disclosure enables customer of the computing resource service provider to obtain predictions and detect potential anomalies. These predictions may allow customers to better prepare for and mitigate potential anomalies.

As described in greater detail below, the predictive modeling engine may obtain aggregated metrics data which is used to train one or more predictive models that are used to generate predictions for one or more forecasting intervals. As described in the present disclosure the aggregated metrics data may be split into various different intervals such as one minute intervals, one day interval, one week intervals, etc. Furthermore, in some embodiments, the training data (e.g., aggregated metrics provided by the customer to train one or more prediction models) is split into k sets of training data. In such embodiments, the one or more prediction models are then trained using k−1 sets of training data with the remaining set of training data used to measure the performance of the one or more predictive models. Once the one or more prediction models are trained, the predictive modeling engine, in various embodiments, generates predictions for various forecasting intervals.

In an example, an online a retail website operated by a particular customer of a computing resource service provider uses the predictive modeling engine to generate predictions of a spike and/or drop in the orders which may be considered an anomaly. The particular customer may then use this information to determine if the anomaly is a result of seasonal behavior, computer system failure, or some other reason or combination of reasons. As described in greater detail below, the predictive models predict expected behavior for a computer system and any predictions and/or observed behavior outside of a specified range (e.g., a number of standard deviations from the mean indicated by the customer) may constitute an anomaly.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a computing resource monitoring service 106 includes a predictive modeling engine 110 that generates predictions for various aspects of customer operated computing resources 104 in accordance with an embodiment. In various embodiments, a computing resource service provider 112 provides computing resources to customers 102 and other entities. The predictive modeling engine 110, in various embodiments, includes software, logic, or other executable code that, when executed by computing resources of the computing resource service provider, provide the customers 102 with predictions as described in greater detail below. Furthermore, the predictive modeling engine 110, as illustrated in FIG. 1, may be a component of the computing resource monitoring service 106 implemented by server computer systems in a data center operated by the computing resource service provider. Customers 102 may use computing resources provided by the computing resource service provider 112 to perform computational tasks, storage operations, execute applications, or generally leverage the computing resource. As described in greater detail below, the computing resources provided by the computing resource service provider 112 may include processing units, storage devices, network appliances, or other devices to support the executing of customer applications and/or tasks. Furthermore, the computing resources may include virtualized computing resources such as virtual machines, virtual storage devices, or any other computing resources capable of being virtualized.

The customer operated computing resources 104 include any computing resources used to execute an application or other task on behalf of the customer 102. Furthermore, the customer operated computing resources 104 may include computing resources provided by the computing resource service provider 112 and/or customer 102. In one example, a portion of the customer operated computing resources 104 is provided by the customer 102 in an on-premises data center (e.g., a data center operated by the customer 102) and another portion of the customer operated computing resources 104 is provided by the computing resource service 112. For the purposes of the present disclosure the customer operated computing resources 104 may include computing resources entirely provided by the computing resource service provider 112 or the customer 102. In embodiments, where the customer operated computing resources 104 are provided by the customer 102, the customer 102 provides the computing resource monitoring service 106 with access to metrics information generated by the customer operated computing resource 104. In one example, the customer 102 executes an agent or other component of the computing resource monitoring service 106 responsible for transmitting metrics information to the computing resource monitoring service 106.

In various embodiments, the computing resource monitoring service 106 includes a front-end server, which obtains metrics from a variety of different sources, including customer operated computing resources 104 (including computing resources provided by the computing resources service provider 112 and/or the customer 102), various other services of the computing resource service provider, and computing resources made available to the customers 102 through the various services. In one example, the metrics information is obtained from a storage service that provides a customer operated virtual machine with access to a logical volume. The metrics information, as described above, may include log data or other information indicating operational information obtained from the customer operated computing resources 104 including information obtained by obtaining various measurements from the customer operated computing resources 104. In one example, the metrics include a measurement of the amount of memory consumed by the customer operated computing resources 104.

The metrics information obtained by the computing resource monitoring service 106, in various embodiments, is stored in an aggregated metrics data store 108. In one example, the aggregated metrics data store 108 is provided a storage service of the computing resources service provider 112. In another example, the computing resource monitoring service 106 include storage resources provided by the computing resource service provider 112. The computing resource monitoring service 106 may store metrics information for processing by the predictive modeling engine 110. In various other embodiments, the metrics information is obtained as a stream of data, for example, from a data streaming service. In yet other embodiments, the aggregated metrics data store 108 is a repository for maintaining metrics data including time series metrics data (e.g., data indicating a measurement of the customer operated computing resources 104 over an interval of time). In general, the metrics described in the present disclosure includes time series data to enable the predictive modeling engine 110 to generate predictions based at least in part on previously collected metrics information. In one example, the metrics data includes central processing unit (CPU) usage information with sub-second granularity obtained from millions of computers systems in a fleet.

As described above, the aggregated metrics may include measurements obtained from computational resources (e.g., the customer operated computing resources 104) such as activity volume, latencies, and resource utilization. In various embodiments, activity volume includes measuring aggregate activity of a service, such as order rates of an online retailer, data volume activity as indicated in various logs, or a number of connections for networking appliance. In other embodiments, latency includes process time between two expected and defined incidences indicating a process and/or duration of performing particular tasks. For example, service call response time, ping response time on networks, or order process times at the online retailer. In yet other examples, utilization includes consumptions of capacity aggregated by type of computing resources, such as CPU utilization or memory consumption. Furthermore, as described above, the metrics information the metrics information is aggregated over time and may be stored in the aggregated metrics data store 108.

As described in greater detail below, the predictive modeling engine 110 may determine seasonality patterns and trend component for metrics using one or more predictive models. In one example, the customer 102 provides the computing resource monitoring service 106 with aggregate metrics indicating a measure of the number of errors of the customer operated computing resources 104. The predictive modeling engine 110, in such examples, used one or more prediction algorithms to generate predictions of a number of future errors. The aggregated metrics data may be obtained from any previous interval of time and the predictions may be generated for any interval of time in the future (e.g., one minute or two hours). The prediction algorithms may include any number of algorithms such as the Holt-Winters exponential triple smoothing (HW) algorithm. The HW algorithm can be defined by the following equations:

$$S_t = \alpha \frac{y_t}{I_{t-L}} + (1-\alpha)(S_{t-1} + b_{t-1})$$

$$b_t = \gamma(S_t - S_{t-1}) + (1-\gamma)b_{t-1}$$

$$I_t = \beta \frac{y_t}{S_t}(1-\beta)I_{t-L}$$

$$F_{t+m} = (S_t + mb_t)I_{t-L+m}$$

Where y represents the metrics data (e.g., the obtained observation of the customer operated computing resources 106), t is an index denoting an interval of time, S represents smoothed metrics data, b represents the trend factor (e.g., do the metrics indicate a downward trend in the number of error or do the metrics indicate an upward trend in the number of orders on the online marketplace), L represents an expected seasonality of the metrics data (e.g., an interval of time between two points where degree is 0 on sine wave), I represents a seasonal index, m represents an amount of time in the future for prediction data (e.g., a point in time the customer 102 is requesting a prediction for), F represents the forecasted data at m intervals of time ahead, α represents a smoothing parameter indicating an amount of noise in the metrics data (determined during training with a condition 0<α<1), γ represents a trend parameter indicating a trend of the metrics data (determined during training with a condition 0<γ<1), and β represents a smoothing parameter indicating a seasonality of the metrics data (determined during training with a condition 0<β<1). Note that the above equations are examples, but other equations are considered as being within the scope of the present disclosure. Example equations include equations based at least in part on some or all of the above variables but which vary in some extent, such as by having different constants or being configured with different mathematical operations but exhibiting similar behavior. Other variables may also be used in accordance with various implementations and, in other implementations, some variables are omitted.

Although the HW algorithm is described in detail in the present disclosure, any number of modeling algorithms may be used to generate a prediction. Other examples of predictive modeling algorithms that may be practiced in accordance with the present disclosure include auto-regressive, moving average, linear and non-linear models such as variations of autoregressive with conditional heteroscedasticity (ARCH). In various embodiments, the computing resource monitoring service 106 or component thereof, such as the predictive modeling engine, utilizes an aggregation function to generate the aggregated metrics data. The aggregation function may utilize several statistical methods such as minimum, maximum, average, sum, data point count, percentages, percentiles, and/or other statistical methods to reduce or otherwise aggregate the amount of metrics obtained from the customer operated computing resources 104.

Returning to the HW algorithm described above, the HW algorithm contains constants that, in various embodiments, are determined prior to applying the HW algorithm for forecasting (e.g., using the predictive modeling engine to generate a prediction). The constants include, for example, α, β, γ, m and L. In an embodiment, during a training phase of all of the parameters are determined except for m in our method. This is because m is provided by the customer 102 and is the interval of time in the future the customer 102 is requesting a prediction for. In addition, predictions may be calculated continuously for the interval m. For example, if the customer 102 sets the interval m to two hours, two hours the predictive modeling engine 110 calculates a prediction for the two hours interval and recalculates the prediction every minute. This may be advantageous because it allows the predictive modeling engine to collect more metrics data, update the predictive modeling algorithms used to generate the prediction, and provide more accurate predictions.

In various embodiments, the predictive modeling engine 110 generates a performance metric or other measure to determine the performance of particular predictive modeling algorithms in generating predictions based at least in part on the aggregate metrics data provided by the customer 102. For example, the predictive modeling engine 110 uses a mean squared error (MSE) or mean squared deviation (MSD) algorithm to measure the performance of a particular predictive modeling algorithm to accurately generate a prediction. The MSE or MSD of the particular predictive modeling algorithm (e.g., a procedure defined by the predictive modeling algorithm for estimating an unobserved quantity, such as future aggregated metrics data) measures the average of the squares of the errors or deviations. In other words, the MSE or MSD of the particular predictive modeling algorithm is the difference between the actual values and the values estimated by the particular predictive modeling algorithm.

Other performance metrics and/or risk functions, such as mean absolute scaled error (MASE), mean absolute percentage error (MAPE), root mean square error (RMSE), receiver operating characteristic (ROC), may be used in connection with the present disclosure. In general, the predictive modeling engine 110 may determine the performance of various predictive modeling algorithms to accurately generate predictions based at least in part on aggregated metrics data and provide this performance information to the customer 102. For example as described in greater detail below, the predictive modeling engine 110 uses this performance information to determine appropriate predictive modeling engines based at least in part on a type of aggregated metrics data provided by the customer 102, suggest predictive modeling algorithms to the customer 102, providing an indication to the customer 102 of the accuracy of predictive modeling algorithms, or generally inform the customer 102 of the performance and the predictive modeling engine 110 and enable the customer 102 to improve the performance.

In various embodiments, after the training the predictive modeling algorithms and generating predictions based at least in part on the predictive modeling algorithms and the aggregated metrics data, the predictive modeling engine 110 determines a confidence interval associated with the predictions. In one example, the confidence interval includes a value that is 3 standard deviations above and below the prediction (e.g., assuming a normal distribution, 99.7% of predictions are within the confidence interval). In another example, the customer 102 defines a confidence interval of 1 standard deviation above and below the prediction (e.g., 68% of predictions are within this confidence interval). The customer 102 may define any confidence interval and may define a plurality of confidence intervals.

In addition, the customer 102 may associate one or more alarm(s) with a confidence interval. For example, the customer 102 defines a confidence interval of 5 standard deviations above and below a prediction and associate an alarm with severity level 5 with the confidence interval. The alarm, in various embodiments, indicates one or more operations to be performed by the predictive modeling engine 110, computing resource monitoring service 106, computing resource service provider 112, other service of the computing resource service provider, or a combination thereof. In one example, a particular alarm indicates a set of operations that cause one or more customers operated computing resources 104 to be terminated and a notification to be transmitted to the customer 102. In this example, a virtual computing resource service terminates the customer operated computing resources 104 and a notification service transmits the notification to the customer 102. In various embodiments, the alarms indicate operations that can be performed automatically (e.g., without a contemporaneous customer request) based at least in part predictions generate by the predictive modeling engine 110 or other operations of the computing resource monitoring service 106.

Furthermore, the customer 102 may indicate a severity level associated with an alarm. For example, the customer 102 defines a first alarm with a first confidence interval of 3 standard deviations above or below the predictions with severity level of 3 and second alarm with a second confidence interval of 5 standard deviations above or below the predictions with severity level of 2. In such embodiments, the customer 102 defines particular operations to be executed based at least in part on a severity level. For example, an alarm associated with a severity level of 5 causes the computing resource service provider 112 to terminate all of the customer operated computing resources 104, a severity level of 3 causes the computing resource service provider 112 to transmit a notification to the customer 102, and a severity level of 1 causes the computing resource service provider 112 to generate a log entry associated with the prediction. The severity levels may be ordered or unordered, sequential from least sever to most sever, or from most sever to least sever as indicated by the customer 102.

Figure 2:
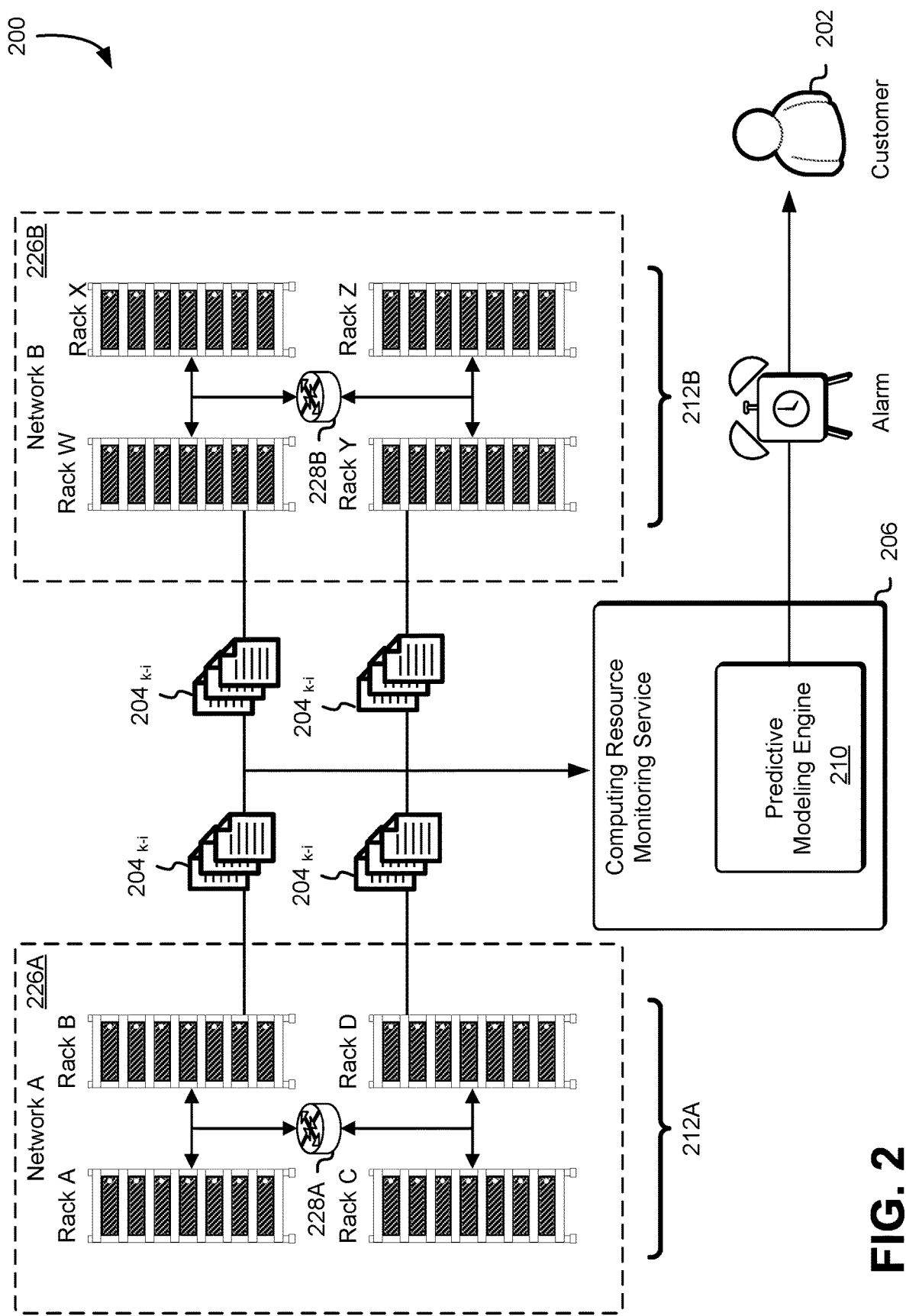
FIG. 2 illustrates an environment in which a predictive modeling engine of a computing resource monitoring service obtains aggregated metrics and generates predictions on behalf of a customer in accordance with an embodiment.

FIG. 2 illustrates an aspect of an environment 200 in which an embodiment may be practiced. Specifically, FIG. 2 depicts the collection, processing, and analysis of metrics data $204_{k-i}$ (e.g., information obtained from the operation of customer operated computing resources as described above) generated by computing resources. As described above, a predictive modeling engine 210 may use a predictive modeling algorithm to perform training, analysis, error detection, anomaly detection, and/or monitoring of the computing resources based at least in part on the metrics data $204_{k-i}$. The environment 200 may include a computing resource monitoring service 206 that receives metrics data $204_{k-i}$ from computing resources executed by servers in the sets of racks 212A-212B. The data collected by the computing resource monitoring service 206 may include metrics data $204_{k-i}$ obtained from different computing resources executed by the servers in the sets of racks 212A-212B.

In various other embodiments, a stream service or one or more other intermediary computer systems provide the metrics data $204_{k-i}$ to the computing resource monitoring service 206. The computing resource monitoring service 206, in an embodiment, is a computer systems (e.g., server computer system, virtual machine, or distributed computing system) operated by a computing resource service provider that obtains metrics data $204_{k-i}$ generated by computing resources as described above in connection with FIG. 1. In various embodiments, the computing resource monitoring service 206 processes the metrics data $204_{k-i}$ and generates aggregated metrics data which may be consumed by the predictive modeling engine 210, for example, as a stream of data or as a metrics data file in a particular format to enable the predictive modeling engine 210 to train one or more predictive modeling algorithms and/or generate predictions of future measurements of the computing resources.

As illustrated in FIG. 2, the sets of racks 212A-212B may be physical hardware that hosts one or more servers or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. For example, as illustrated in FIG. 2, the servers of the set of racks 212A share the network 226A. Likewise, the servers of the set of racks 212B share the network 226B.

The networks 226A-226B may be data communication pathways between one or more electronic devices. The networks 226A-226B may be wired or wireless networks and may use any of a variety of communications protocols for organizing their network traffic. The networks 226A-226B may allow the sharing of files, data, and other types of information between the one or more electronic devices accessible through the data communication pathways. Each of the networks 226A-226B may be associated with a router, such as an aggregation router that aggregates the servers of the respective set of racks into the common network, separate from the router associated with the other network. Each of the networks 226A-226B may be on a different subnet than the other network. For example, as illustrated in FIG. 2, the servers of the set of racks 212A may be commonly connected to a router 228A. Similarly, the servers of the set of racks 212B may be commonly connected to a router 228B. The routers 228A-228B may be networking devices that forward packets between computer networks, such as between the networks 226A-226B. All of the devices described above, may provide metrics data to the computing resource monitoring service 206.

In various embodiments, the computing resource monitoring service 206 also include a data warehouse or data storage system that stores the aggregated metrics data and/or the metrics data $204_{k-i}$ such that the stored data may be queried or otherwise obtained by the predictive modeling engine 210. In this manner, the predictive modeling engine 210 may be able to query the computing resource monitoring service 206 to obtain particular aggregated metrics data and/or the metrics data $204_{k-i}$ as well as being provided the aggregated metrics data and/or the metrics data $204_{k-i}$ through a data stream or other mechanism for providing the data to the predictive modeling engine 210. In various embodiments, the data stream includes the aggregated metrics data and/or the metrics data $204_{k-i}$. In one example, the stream service is responsible for generating the aggregated metrics data based at least in part on an aggregation algorithm as described above.

Additionally, predictive modeling engine 210 may be another service or computer system of the computing resource service provider. For example, computing resources executed by the servers on racks 212A and 212B may store data on behalf of the customer 202, and the predictive modeling engine 210 may be a service of the computing resource service provider that generates predictions associated with the data stored on behalf of the customer 202 (e.g., increases or decreases in the amount of data stored, request frequency, latency, consumption, etc.). The predictive modeling engine 210 may include software or other executable code that when executed by one or more processors causes the predictive modeling engine 210 to implement the predictive modeling algorithm as described above. In addition, the predictive modeling engine 210 may be executed by the servers in the racks 212A and 212B.

Figure 3:
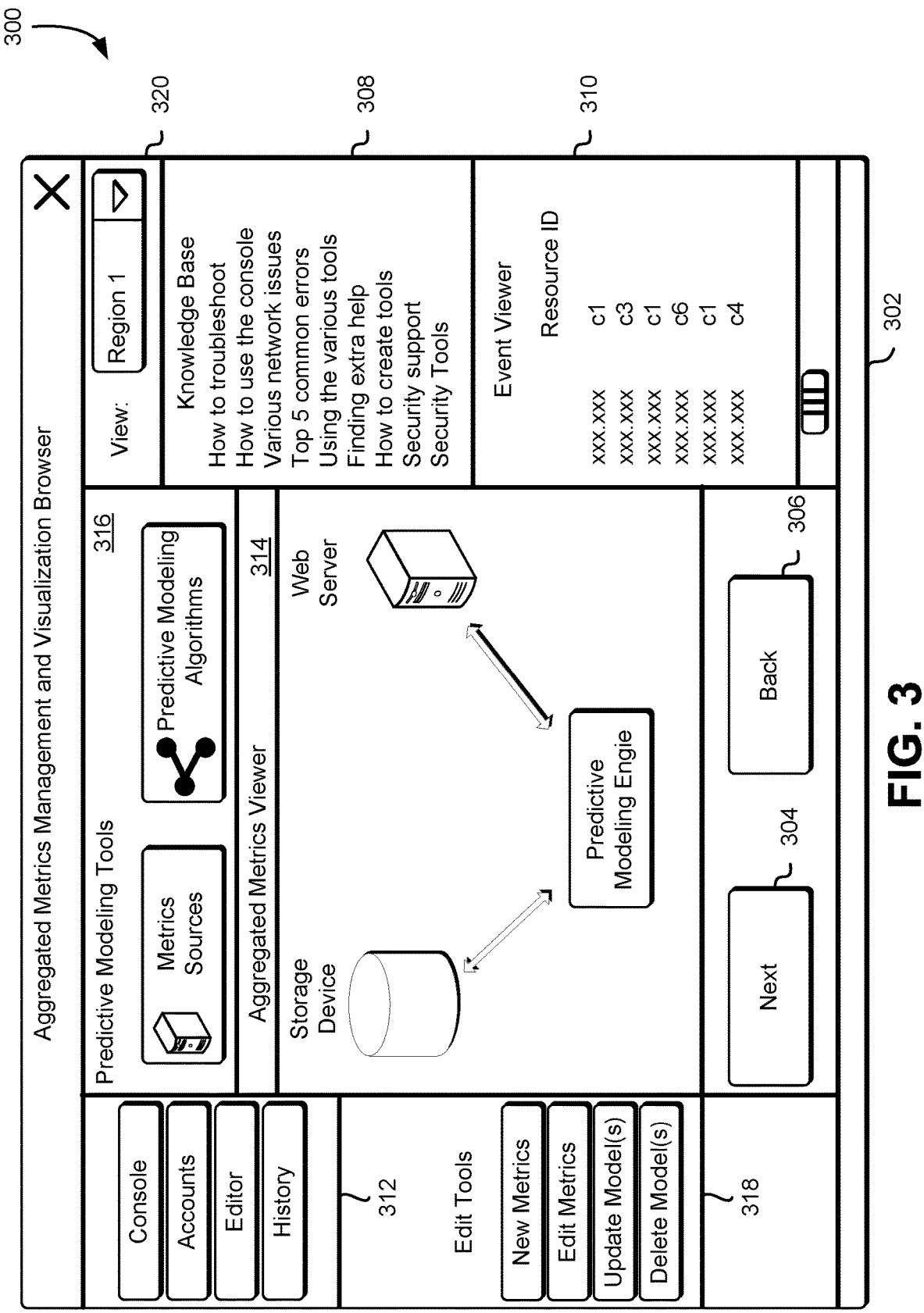
FIG. 3 is a diagram illustrating a management console implemented as a webpage for visualizing information associated with providing aggregated metrics information for training of predictive models and generation of prediction in accordance with at least one embodiment.

FIG. 3 illustrates an example environment 300 where an aggregated metrics management and visualization browser 302 may be used to provide aggregated metrics data to a predictive modeling engine as well as train one or more predictive modeling algorithms as described in the present disclosure at least as described above in connection with FIGS. 1 and 2 and in accordance with at least one embodiment. The aggregated metrics management and visualization browser 302 enables a customer to select metrics data to provide to a computing resource monitoring service, determine appropriate metrics to provide to the computing resource monitoring service, training one or more predictive models, troubleshoot issues associated with prediction and/or predictive models, receive recommendations associated with predictive models, search a knowledge base for information related to particular predictive modeling algorithms, and generally train and manage the predictive modeling engine of a computing resource monitoring service. In various embodiments, the aggregated metrics management and visualization browser 302 is a computer system service such as a web service and provided as the network security service of the computing resource service provider as described in the present disclosure.

As illustrated in FIG. 3, the aggregated metrics management and visualization browser 302 is provided as a user interface executed by an application, such as a web browser executing on a computer system operated by the customer, as well as other user interfaces that may be used to present predictive modeling engine information and training information to the customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The computing resource service provider may receive the selection information from the customer's computing device and provide the information to other computing resources of the network security service. For example as illustrated in FIG. 3, the customer is presented with a visualization of metrics data which is aggregated and provided to the predictive modeling engine in a display pane labeled as the "Aggregated Metrics Viewer" 314. The display pane may include any of the information described in the present disclosure, including a visualization of aggregated metrics data, predictive modeling information, alarm/notification information, predictions, and performance metrics. The user interface may be generated or caused to be generated by the computing resource monitoring service or component thereof, such as a predictive modeling engine, as described in the present disclosure. Furthermore, as illustrated in FIG. 3, the aggregated metrics management and visualization browser 302 may include a "Next" button 304 and a "Back" button 306 to enable to customer to perform an action associated with the aggregated metrics management and visualization browser 302 as described in greater detail below.

The aggregated metrics management and visualization browser 302 may include predictive modeling tools 316 that aid the customer in generating and/or establishing predictive model used by the predictive modeling engine to generate predictions. In addition the predictive modeling tools 316 may be used to aid the customer in generating alarms based at least in part on a result generated by the predictive modeling engine. For example, the predictive modeling tools 316 may include a graphical user interface element, such as the buttons illustrated in FIG. 3, where selection of the graphical user interface element may cause the computing resource monitoring service to display information to the customer to aid the customer in establishing alarms used to notify the customer of possible anomalous events as described above. For example, selection of the "Metrics Sources" button causes the information to be displayed in the display pane of the aggregated metrics management and visualization browser 302 that guides the customer through a process of selecting aggregated metrics data to provide to the predictive modeling engine to training one or more of predictive modeling algorithms to generate predictions. Based at least in part on the information displayed, the customer may determine information associated with an expected performance of customer operated computing resources.

As illustrated in FIG. 3, the aggregated metrics management and visualization browser 302 includes a next button 304 and a back button 306. Selection by the customer of the next button 304 may cause the underlying code executing the aggregated metrics management and visualization browser 302 to transmit information to the computing resource monitoring service to proceed to the next step of the process and described in the present disclosure. Selection of the back button 306 may cause the underlying code executing the aggregated metrics management and visualization browser 302 to return to a previously navigated web page. Although not illustrated in FIG. 3 for simplicity, the customer may be provided with additional information associated with the selection of aggregated metrics data, predictive modeling algorithms, or predictions as described in the present disclosure. For example, the customer is provided with information indicating the needs for additional or different aggregated metrics data.

As illustrated in FIG. 3, the aggregated metrics management and visualization browser 302 further includes a set of options 312 used to perform various functions in connection with the aggregated metrics management and visualization browser 302. The set of options 312 may be a set of functions included in the aggregated metrics management and visualization browser 302 that enables a customer to perform a variety of operations such as managing accounts, creating alarms, creating aggregated metrics, and managing customer-operated computing resources. The options 312 may be configured as graphical user interface elements of the aggregated metrics management and visualization browser 302.

The account button may be configured to enable the customer to select particular customer accounts to perform various operations associated with a particular service in connection with the selected customer accounts. In various embodiments, the customer operating the aggregated metrics management and visualization browser 302 is required to have, at the minimum, complete read permissions across all of the customer services and computing resources associated with the accounts for which the customer is attempting to perform operations associated with the particular service. The editor button may be configured to enable the customer to create or edit alarms for one or more predictive modeling algorithms used by the predictive modeling engine as described in the present disclosure.

In various embodiments, the computing resource monitoring service provides, through the aggregated metrics management and visualization browser 302, the customer with resources to aid in determining what predictive modeling algorithms to use based at least in part on the aggregated metrics data selected, what operations the customer may perform to increase the performance of the predictive modeling engine, and/or information associated with the accuracy of generated predictions. The aggregated metrics management and visualization browser 302 may further include an event viewer 310. The event viewer may be configured to provide information related to anomalous or other events predicted during the operation of the predictive modeling engine. This information may provide a set of data associated with systemic, operational, or maintenance events associated with customer operated computing resources along with schedules and remediation suggestions. In one example, the event includes information indicating a particular prediction has triggered a particular alarm for a particular customer operated computing resource. The information displayed in the event viewer 310 may be generated automatically or in response to a request and/or operation of the customer. The aggregated metrics management and visualization browser 302 may also include a knowledge base 308 that includes articles and provides access to curated content based at least in part on the information collected from customers of the computing resource service provider or generated by the computing resource service provider. The knowledge base may include suggestions on predictive modeling algorithms, alarms, and/or aggregated metrics data. In addition, the computing resource monitoring service may suggest or recommend particular knowledge-based articles based at least in part on information obtained by the computing resource monitoring service.

The customer may use editing tools 318 to edit, create, or modify existing aggregated metrics data, predictive models, and/or alarms. In one example, the customer uses the editing tools 318 to edit a set of aggregated metrics data associated with a particular predictive modeling algorithm. Once a customer has established a connection to the computing resource monitoring service through the aggregated metrics management and visualization browser 302, the aggregated metrics management and visualization browser 302 may automatically populate the customer's display with the information in various components of the aggregated metrics management and visualization browser 302, such as the event viewer and knowledge base.

An operation enabled by the aggregated metrics management and visualization browser 302 includes a view of different regions from a drop down menu 320. The different regions may include different geographical regions or different logical regions within the same or different geographical regions. For example, different regions may include two or more separate virtual networks. Customers may navigate to a particular group using a graphical user interface element as illustrated in FIG. 3. Selection of a particular region may limit the information and generate views of information specific to the region.

Figure 4:
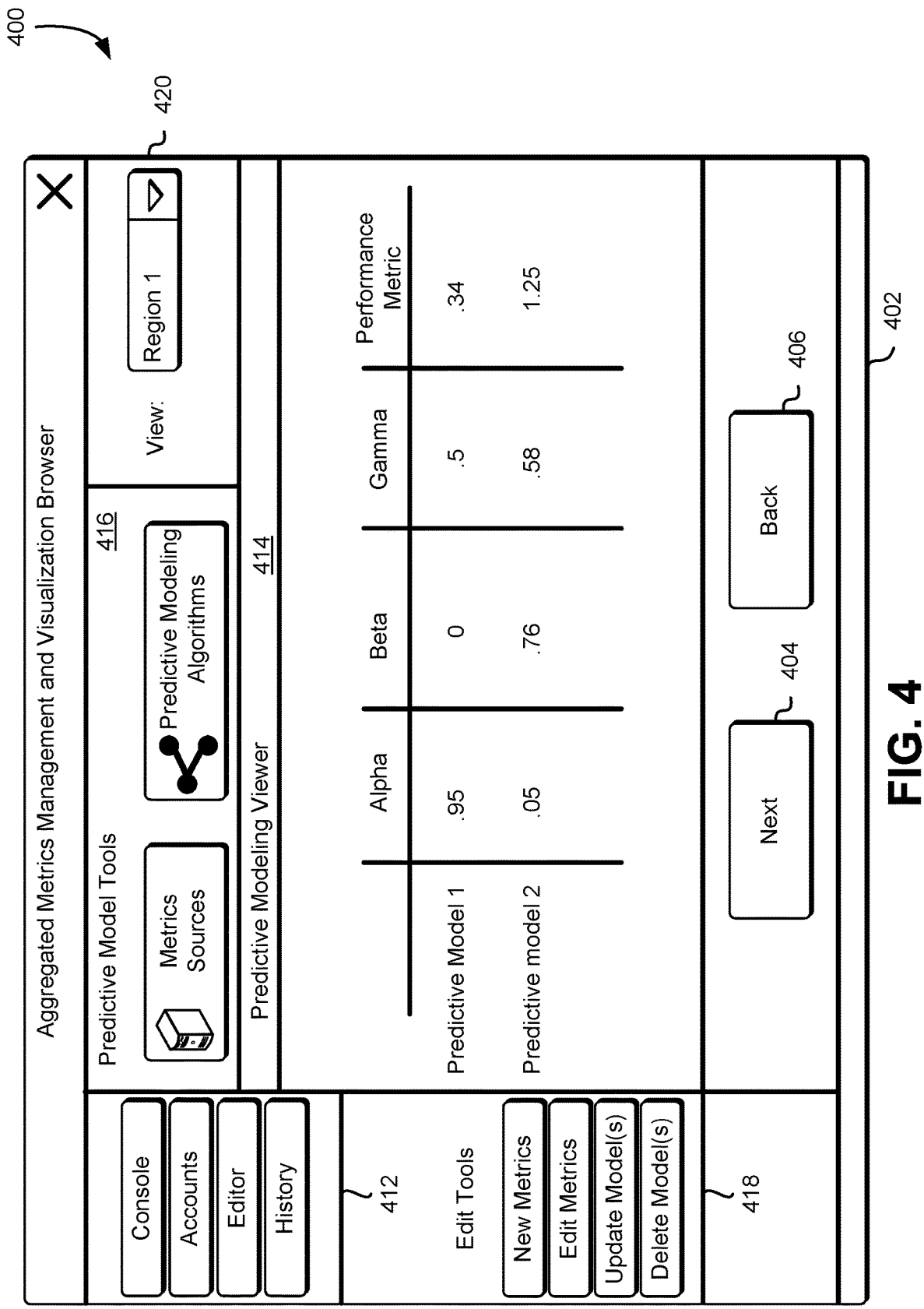
FIG. 4 is a diagram illustrating a management console implemented as a webpage for visualizing information associated with selection of prediction models and alarms in accordance with at least one embodiment.

FIG. 4 illustrates an example environment 400 where an aggregated metrics management and visualization browser 402 may be used to provide information associated with training and/or predictions of one or more predictive modeling algorithms implemented by a predictive modeling engine as described in the present disclosure at least as described above in connection with FIGS. 1 and 2 and in accordance with at least one embodiment. As described above, in various embodiments, the aggregated metrics management and visualization browser 402 is a computer system service such as a web service and provided as the network security service of the computing resource service provider as described in the present disclosure.

As illustrated in FIG. 4, the aggregated metrics management and visualization browser 402 is provided as a user interface executed by an application, such as a web browser executing on a computer system operated by the customer, as well as other user interfaces that may be used to present predictive modeling engine information and training information to the customer and may, in some embodiments, be generated by the computing resource service provider and sent to the customer's display for rendering. In other embodiments, the customer's computing device may include functionality to generate some or all portions of the user interface. The computing resource service provider may receive the selection information from the customer's computing device and provide the information to other computing resources of the network security service.

For example as illustrated in FIG. 4, the customer is presented with information associated with the operations of the predictive modeling engine in a display pane labeled as the "Predictive Modeling Viewer" 414. The display pane may include any of the information described in the present disclosure, including a visualization of information determined based at least in part on one or more predictive modeling algorithms, predictions, and/or performance metrics. As illustrated in FIG. 4, the display pane includes α, β, and γ as described above. Furthermore, the display pane may include a performance metric of a particular predictive modeling algorithm as described above, such as the MSE of the predictive modeling algorithm. As described in greater detail below in connection with FIG. 5, this information may be determined using a k-fold cross validation technique.

This information may allow the customer to make determination about the aggregated metrics data provided and the performance of the predictive modeling algorithm. For example, a performance metric within a range relative to a threshold may indicate that the performance of a particular predictive modeling algorithm is too low to accurately generate predictions. In yet other embodiments, this information is used by the computing resource monitoring service to generate suggestions to the customer based at least in part on one or more heuristics. For example, a particular value of β indicates a seasonality of over three months, a particular heuristic then causes the computing resource monitoring service to suggest a particular predictive modeling algorithm or particular type of aggregated metrics data based at least in part on the seasonality indicated by β. Furthermore, as illustrated in FIG. 4, the aggregated metrics management and visualization browser 402 may include a "Next" button 404 and a "Back" button 406 to enable to customer to perform an action associated with the aggregated metrics management and visualization browser 402 as described in greater detail above.

The aggregated metrics management and visualization browser 402 may include predictive modeling tools 416 that aids the customer in generating and/or establishing predictive model used by the predictive modeling engine to generate predictions as described in greater detail above. As illustrated in FIG. 4, the aggregated metrics management and visualization browser 402 further includes a set of options 412 used to perform various functions in connection with the aggregated metrics management and visualization browser 402. The set of options 412 may be a set of functions included in the aggregated metrics management and visualization browser 402 that enables a customer to perform a variety of operations such as managing accounts, creating alarms, creating aggregated metrics, and managing customer-operated computing resources. The options 412 may be configured as graphical user interface elements of the aggregated metrics management and visualization browser 402.

The customer may use editing tools 418 to edit, create, or modify existing aggregated metrics data, predictive models, and/or alarms. For example, the customer may use the editing tools 418 to edit a set of aggregated metrics data associated with a particular predictive modeling algorithm. Once a customer has established a connection to the computing resource monitoring service through the aggregated metrics management and visualization browser 402, the aggregated metrics management and visualization browser 402 may automatically populate the customer's display with the information in various components of the aggregated metrics management and visualization browser 402, such as the event viewer and knowledge base.

An operation enabled by the aggregated metrics management and visualization browser 402 includes a view of different regions from a drop down menu 420. The different regions may include different geographical regions or different logical regions within the same or different geographical regions. For example, different regions may include two or more separate virtual networks. Customers may navigate to a particular group using a graphical user interface element as illustrated in FIG. 4. Selection of a particular region may limit the information and generate views of information specific to the region.

Figure 5:
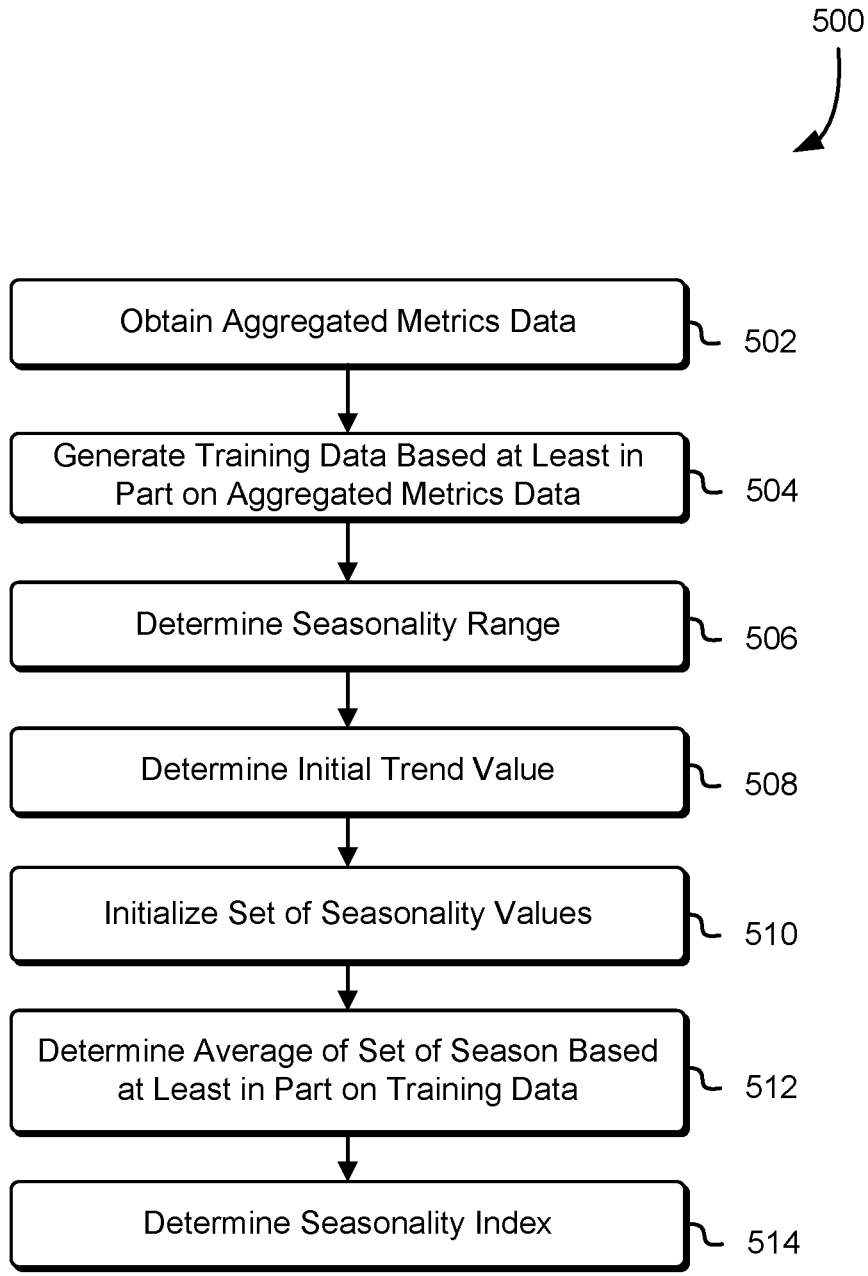
FIG. 5 is a block diagram illustrating a process for training predictive models in accordance with an embodiment.

FIG. 5 is a block diagram illustrating an example of a process 500 for training a predictive modeling algorithm to be used by a predictive modeling engine to generate predictions associated with customer operated computing resources in accordance with at least one embodiment. Some or all of the process 500 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environment 100 described in conjunction with FIG. 1, such as a predictive modeling engine, by multiple computing devices in a distributed system of a computing resource service provider or by a service provided by a computing resource service provider. The process 500 includes a series of operations for training a predictive modeling algorithm such as the HW algorithm described above. For example, the process 500 includes obtaining aggregated metrics data 502. As described above, the aggregated metrics data may be obtained from a stream service or other intermediary the obtain metrics information from one or more customer operated computing resources and aggregates the metrics information. Furthermore, customer may select aggregated metrics data to provide to the predictive modeling engine for training.

In step 504, the predictive modeling engine generates training data based at least in part on the aggregated metrics data. For example, the predictive modeling engine may designate a portion of the aggregated metrics data as training data. In another example, the aggregated metrics data obtained is used as training data. In step 506, the predictive modeling algorithm determines a seasonality range. The seasonality range is a range of values used to train the predictive modeling algorithm. For example, a low value of 1 minute and high value 1 week is set by the predictive modeling engine. In addition, the predictive modeling algorithm may evaluate metrics data over a certain interval of granularity. In one example, the aggregated metrics data contains information collected at one second intervals; however, the interval of granularity for the predictive modeling algorithm may only be one minute. Therefore, the predictive modeling engine may train the predictive modeling algorithm at one minute intervals from 1 minute (e.g., the low value) to one week (e.g., the high value) over the seasonality range.

In step 508, the predictive modeling engine determines an initial trend value. The initial trend value, in various embodiments, is used by the predictive modeling engine to train the predictive modeling algorithm. The initial trend value is defined by the following equation:

$$b_0 = \frac{1}{L}\left(\frac{y_{L+1} - y_1}{L} + \frac{y_{L+2} - y_2}{L} + \ldots + \frac{y_{L+L} - y_L}{L}\right)$$

Where L is the seasonality range as described above. As described in greater detail above in connection with FIG. 1, this information may be used to generate the predictive modeling algorithm which is used to generate predictions. In step 510, predictive modeling engine initializes a set of seasonality values. Returning to the example above, the seasonality index has 7 days of metrics data (e.g., a low value of 1 minute and a high value of 1 week) with 1 minute granularity resulting in 10,080 points for the value L. In step 512, the predictive modeling engine uses the following formula to initialize seasonality index for a training data set that is k weeks long:

$$A_p = \frac{\sum_{i=1*p}^{L*p} y_i}{L},$$
$$p = 1, 2, 3, \ldots n$$
$$n = \frac{\text{amount of training data}}{L}$$

where $A_p$ is the average of the $p^{th}$ season determined based at least in part on the training data. In various embodiments, this information is used to determine the seasonality index. In step 514, the predictive modeling engine determines the seasonality index. The seasonality index may be calculated using the average of each season (e.g., an interval of time during which the training data may indicate some pattern) as described above. The seasonality index is calculated using the following formula:

$$I_q = \frac{\sum_{i=1}^{n} \frac{y_q + (i-1)*L}{A_n}}{n},$$
$$q = 1, 2, 3, \ldots L$$

In various embodiments, after initializing the trend factor and determining seasonality index, the predictive modeling engine determines α, β, and γ. This information may be determined using the formulas described above in connection with FIG. 1. Note that one or more of the operations performed in 502-514 may be performed in various orders and combinations, including in parallel. For example, the system executing the process 500 may determine various values in parallel. In numerous variations to the process 500, one or more of the operations 502-514 may be omitted or performed by other systems of services. For example, all of metrics data is training data and therefore determining the training data is omitted.

Figure 6:
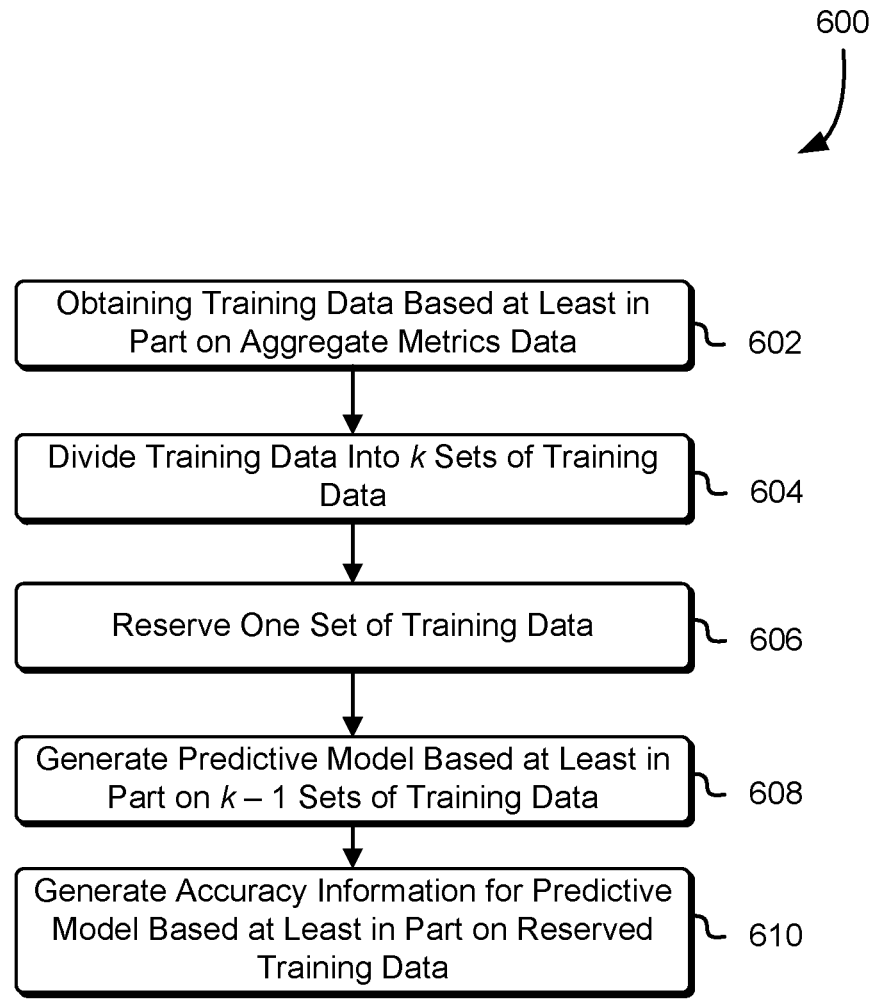
FIG. 6 is a block diagram illustrating a process for executing performance testing of predictive models in accordance with an embodiment.

FIG. 6 is a block diagram illustrating an example of a process 600 for generating a performance metric indicating an accuracy associated with predictions generated by a predictive modeling algorithm in accordance with at least one embodiment. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 100 described in conjunction with FIG. 1, such as a predictive modeling engine, by multiple computing devices in a distributed system of a computing resource service provider or by a service provided by a computing resource service provider. The process 600 includes a series of operations which result in generating a performance metric associated with the predictive modeling algorithm used by the predictive modeling engine to generate predictions associated with customer operated computing resources. For example, the process 600 includes obtaining training data based at least in part on aggregated metrics data 602. The aggregated metrics data may include information obtained from one or more computing resources as described above. Furthermore, the customer, in various embodiments, selects aggregated metrics data to provide to the predictive modeling engine.

In step 604, the predictive modeling engine divides the aggregated metrics data into k sets of training data. The aggregated metrics may be divided based at least in part on a variety of factors such as an interval of time (e.g., aggregated metrics for 1 day), a computing resource or type of computing resource associated, a customer, size of aggregated metrics, an amount of aggregated metrics, or any other factor suitable for dividing aggregated metrics into training sets. In addition, the division of the sets of training data may not be equal. For example, one set of training data of the set of training data includes additional aggregated metrics for determining the performance of the predictive modeling algorithm.

In step 606, one set of training data of the set of training data is reserved. As described above the set of training data is reserved to be used to measure and/or determine the performance of the predictive modeling algorithm used by the predictive modeling engine to generate predictions. In step 608, the predictive modeling engine generates a predictive model using k−1 sets of training data (e.g., the set of training data not including the reserved training data). Training of a predictive modeling algorithm is described in greater detail above, for example, as described above in connection with FIG. 5.

In step 610, the predictive modeling engine generates accuracy information based at least in part on the predictive model and the reserved training set of data. As described above, the accuracy information may be determined based at least in part on the MSE algorithm. In general, the accuracy information may be determined by at least comparing prediction generated by the predictive modeling algorithm and the reserved set of training data. Note that one or more of the operations performed in 602-610 may be performed in various orders and combinations, including in parallel. In numerous variations to the process 600, one or more of the operations 602-610 may be omitted or performed by other systems of services.

Figure 7:
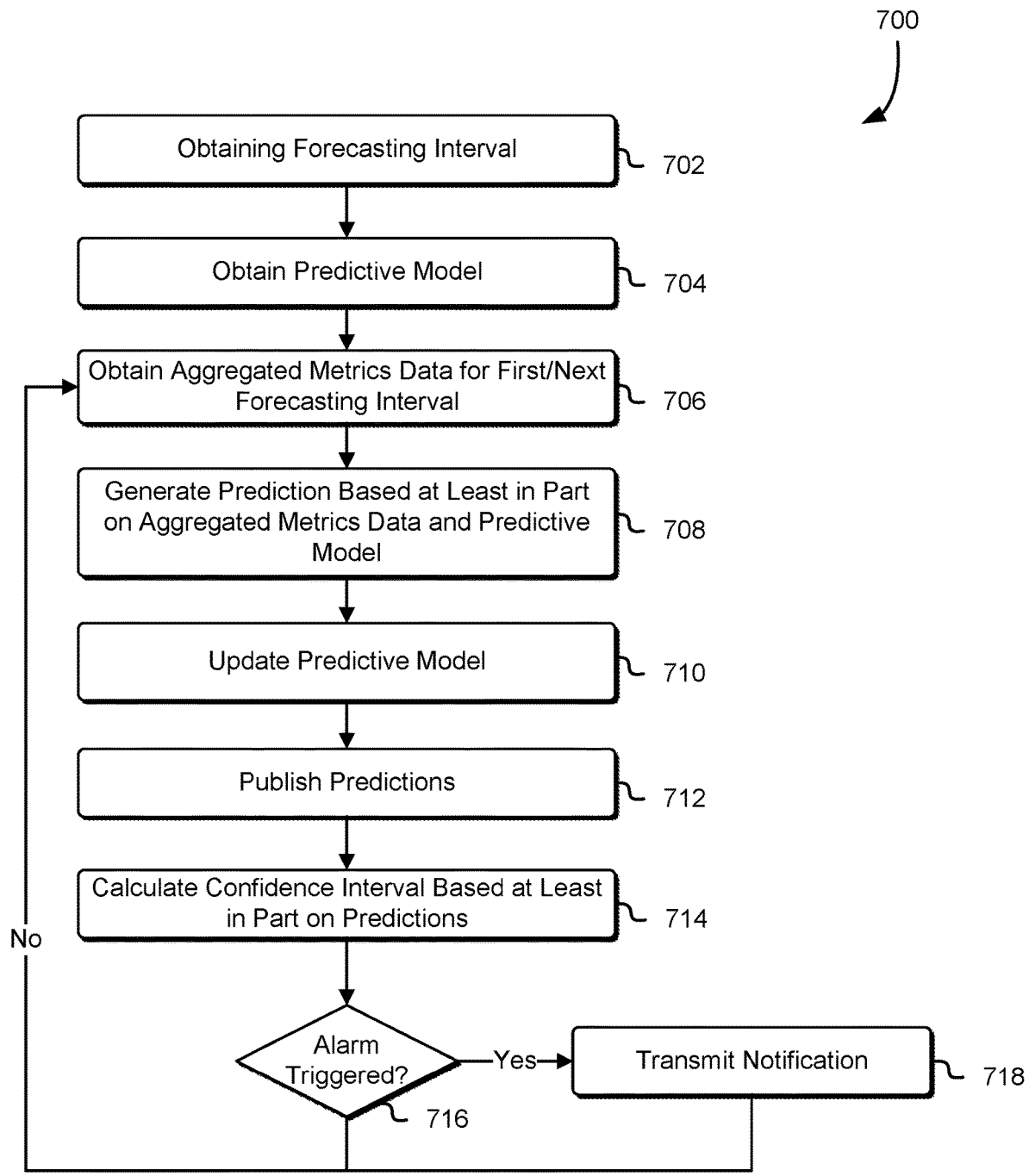
FIG. 7 is a block diagram illustrating a process for generating forecasting data based at least in part on predictive models in accordance with an embodiment.

FIG. 7 is a block diagram illustrating an example of a process 700 for generating predictions and/or triggering one or more alarms for customer operated computing resources based at least in part on aggregated metrics data in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 100 described in conjunction with FIG. 1, such as a predictive modeling engine, by multiple computing devices in a distributed system of a computing resource service provider or by a service provided by a computing resource service provider. The process 700 includes a series of operations which result in the predictive modeling engine generating predictions. For example, the process 700 includes obtaining a forecasting interval 702. As described above, a forecasting interval includes an interval of time in the future a customer has requested predictions for, for example, 4 hours ahead of the current time.

In step 704, the predictive modeling engine obtains one or more predictive models. As described above, the predictive models are trained using training data. Furthermore, the predictive models may include a formula or set of formulas determined based at least in part on aggregated metrics data used as training data. The predictive models may be maintained in memory or other storage device of a computer system as described above. In step 706, the predictive modeling engine obtains aggregated metrics data for the first/next forecasting interval. As described above, various interval described in the present disclosure may be divided based at least in part on a granularity level associated with the aggregated metrics data, customer indicated information, or other factors. For example, a granularity level of one minute is used and the predictive modeling engine calculates a new prediction every minute during the forecasting interval. In other words, for various intervals of within the forecasting interval, the predictive modeling engine may determine a plurality of predictions while contemporaneously or near contemporaneously updating the predictive model.

In step 706, the predictive modeling engine obtains aggregated metrics data for the first/next forecasting interval. As described above, the predictive modeling engine may obtain aggregated metrics data from a stream service. In various embodiments, the predictive modeling engine receives aggregated metrics data, determines predictions based at least in part on the aggregated metrics data, and update the predictive model(s) based at least in part on the aggregated metrics data. In step 708, the predictive modeling engine generates predictions based at least in part on the aggregated metrics data and the predictive model. For example, the predictive modeling engine uses the predictive model generated based at least in part on the HW algorithm as described above. The predictive model is defined by the following formula:

$$F_{t+m} = (S_t + mb_t) I_{t-L+}$$

Where S is the smoothed observation, b is the trend factor, L is the expected seasonality, and I is the seasonality defined by the formula described above (e.g., the formulas defining $\alpha$, $\beta$, and $\gamma$). In addition, t is an value specifying an interval of time (e.g., the granularity level), m is the interval of time in the future for the prediction (e.g., the forecasting interval), and F is the forecast or prediction at m intervals in the future.

In step 710, the predictive modeling engine updates the predictive model. Updating the predictive model, in various embodiments, includes determining new values for various values of the predictive modeling algorithm. For example, calculating new values for variables defined in the formulas described in the present disclosure. In step 712, the predictive modeling engine publishes the predictions. Publishing the predictions includes a variety of operations to provide the predictions to the customer. For example, the predictions are provided to the customer through a console as described above in connection with FIGS. 3 and 4. Other mechanisms of notification may be used in accordance with the present disclosure such as e-mail, push notifications, or other mechanisms.

In step 714, the predictive modeling engine determines a confidence interval based at least in part on the predictions. The confidence interval includes a range of values defined by the customer where if the prediction is within the confidence interval an alarm is triggered, as described above. For example, the customer can define a confidence interval that is 3 standard deviations above and/or under the predicted value (e.g., if the distribution function is normal, 99.7% of samples would be expected to be in this band). Therefore, in this example, anything outside of this band triggers an alarm and indicates to the customer that an anomaly may occur at or near the forecasting interval. In one example, the prediction indicates an increase in online orders placed through an online market place at 2 hours in the future (e.g., the forecasting interval), in response the customer can take mitigating actions. As described above, the confidence interval can be calculated based at least in part on the standard deviation of the historical observations of the data. However, in yet other embodiments, the confidence interval can also be determined using one or more different predictive modeling algorithms or the same predictive modeling algorithm with different time intervals used in training or modified algorithm parameters. In addition, the confidence interval may be determined based at least in part on a likelihood (e.g., a probability) that a particular prediction will be outside of the confidence interval. In one example, the confidence interval is determined using a Bayesian Interval Estimate. In another example, the confidence interval is determined using a moving average, such as a 30-day moving average.

In step 716, the predictive modeling engine determines whether an alarm has been triggered based at least in part on the confidence interval. If the alarm is triggered, in step 718, the predictive modeling engine transmits a notification to the customer. As described above, the customer may set various alarms and severity levels associated with various alarms in addition to notifications and/or types of notifications associated with the alarms. As illustrated in FIG. 7, if the alarm is not triggered, the predictive modeling engine executing the process 700 may return to step 706 to continue the process 700 and continue to determine predictions at the forecasting interval. In various embodiments, the process 700 may continue as indicated by the customer or until the customer indicates to stop the process 700.

Note that one or more of the operations performed in 702-718 may be performed in various orders and combinations, including in parallel. For example, the system executing the process 700 may update the predictive model, generate predictions, determine confidence intervals, and/or detect if an alarm has been triggered. In numerous variations to the process 700, one or more of the operations 702-718 may be omitted or performed by other systems of services. For example, the system executing the process 700 may omit publishing the predications.

Figure 8:
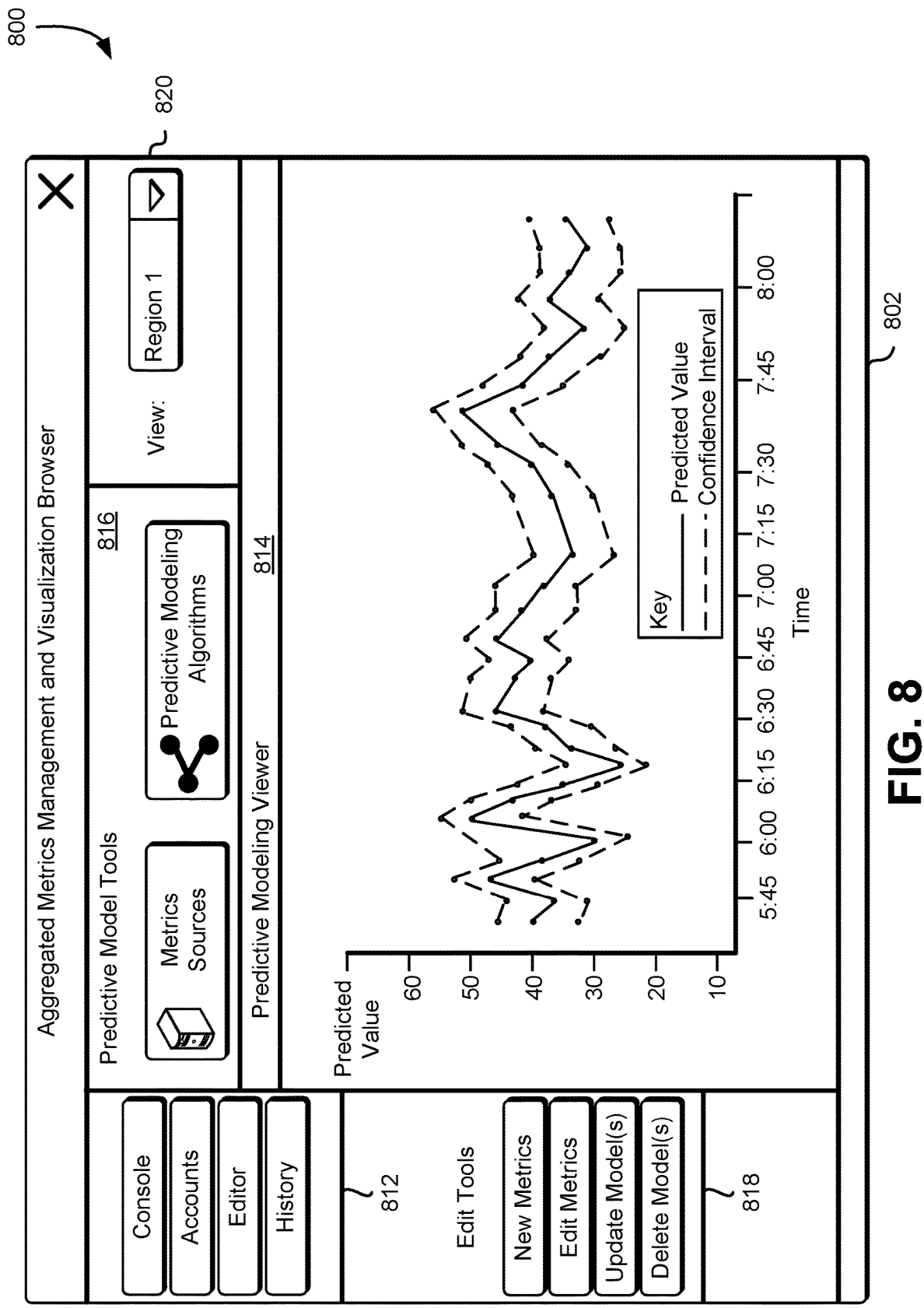
FIG. 8 is a diagram illustrating a management console implemented as a webpage for visualizing information associated with providing information associated with training and/or predictions of one or more predictive modeling algorithms implemented by a predictive modeling engine in accordance with at least one embodiment.

FIG. 8 illustrates an example environment 800 where an aggregated metrics management and visualization browser 802 may be used to provide information associated with training and/or predictions of one or more predictive modeling algorithms implemented by a predictive modeling engine as described in the present disclosure at least as described above in connection with FIGS. 1 and 2 and in accordance with at least one embodiment. As described above, in various embodiments, the aggregated metrics management and visualization browser 802 is a user interface to a computer system service such as a web service and is provided as the network security service of the computing resource service provider as described in the present disclosure.

As illustrated in FIG. 8, the aggregated metrics management and visualization browser 802 is provided as a user interface executed by an application, such as a web browser executing on a computer system operated by the customer, as well as other user interfaces that may be used to present predictive modeling engine information and training information to the customer and may, in some embodiments, be generated by the computing resource service provider and sent to the customer's display for rendering. In other embodiments, the customer's computing device may include functionality to generate some or all portions of the user interface. The computing resource service provider may receive the selection information from the customer's computing device and provide the information to other computing resources of the network security service.

For example, as illustrated in FIG. 8, the customer is presented with information associated with the operations of the predictive modeling engine in a display pane labeled as the "Predictive Modeling Viewer" 814. The display pane may include any of the information described in the present disclosure, including a visualization of information determined based at least in part on one or more predictive modeling algorithms, predictions, and/or performance metrics. As illustrated in FIG. 8, the display pane includes a graphical representation of the predictive model including predictions, observed values, and a confidence interval. The predictions, in various embodiments, are generated by a predictive modeling engine using one or more predictive models as described above. In addition, the confidence interval may be determined, as described above, in the present disclosure. The observed values include data obtained from the computing resources during execution (e.g., metrics data as described above).

The graphical representation illustrated in FIG. 8 shows the predictions generated by the predictive modeling engine as a solid line (e.g., the points of the curve are connected with solid lines). Furthermore, the graphical representation illustrated in FIG. 8 shows the confidence interval as a dashed line. In addition to the confidence interval illustrated in FIG. 8, multiple confidence intervals may be used in accordance with the present disclosure as described above. The graphical representation displayed in the display pane enables users of the predictive modeling engine to view various aspects of the predictive modeling algorithms and the confidence intervals (e.g., performance, history, fit, etc.).

The aggregated metrics management and visualization browser 802 may include predictive modeling tools 816 that aids the customer in generating and/or establishing predictive models used by the predictive modeling engine to generate predictions as described in greater detail above. As illustrated in FIG. 8, the aggregated metrics management and visualization browser 802 further includes a set of options 812 used to perform various functions in connection with the aggregated metrics management and visualization browser 802. The set of options 812 may be a set of functions included in the aggregated metrics management and visualization browser 802 that enables a customer to perform a variety of operations such as managing accounts, creating alarms, creating aggregated metrics, and managing customer-operated computing resources. The options 812 may be configured as graphical user interface elements of the aggregated metrics management and visualization browser 802.

The customer may use editing tools 818 to edit, create, or modify existing aggregated metrics data, predictive models, and/or alarms. For example, the customer may use the editing tools 818 to edit a set of aggregated metrics data associated with a particular predictive modeling algorithm. Once a customer has established a connection to the computing resource monitoring service through the aggregated metrics management and visualization browser 802, the aggregated metrics management and visualization browser 802 may automatically populate the customer's display with the information in various components of the aggregated metrics management and visualization browser 802, such as the event viewer and knowledge base.

An operation enabled by the aggregated metrics management and visualization browser 802 includes a view of different regions from a drop down menu 820. The different regions may include different geographical regions or different logical regions within the same or different geographical regions. For example, different regions may include two or more separate virtual networks. Customers may navigate to a particular group using a graphical user interface element as illustrated in FIG. 8. Selection of a particular region may limit the information and generate views of information specific to the region.

Figure 9:
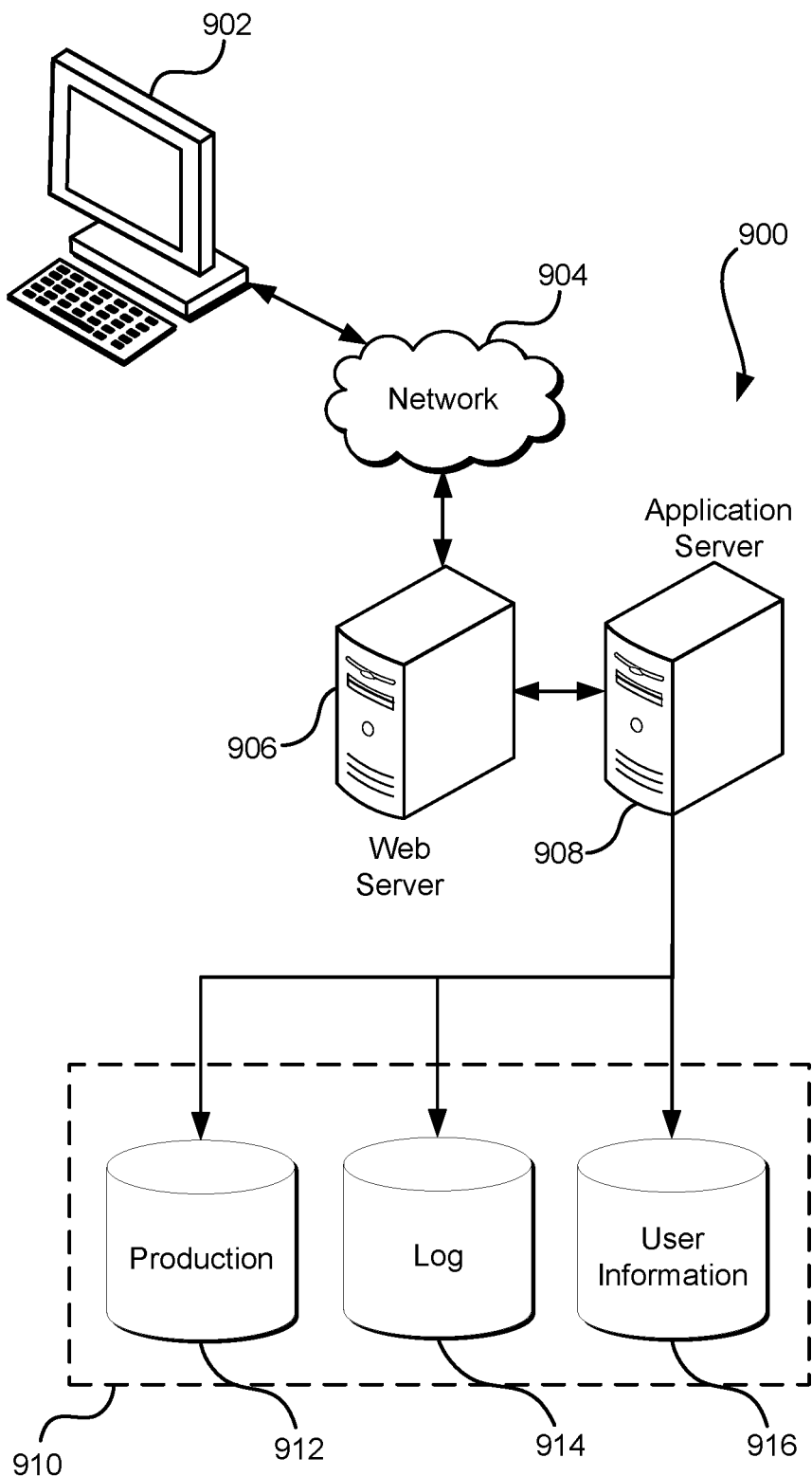
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining aggregated metrics data generated by a plurality of computing resources provided by a computing resource service provider;
   generating, based at least in part on a first portion of the aggregated metrics data and a plurality of predictive modeling algorithms, training data for a plurality of predictive models;
   determining a plurality of performance metrics applicable to the plurality of predictive models;
   providing, based at least in part on the plurality of performance metrics, a suggestion to a customer indicating a predictive model from the plurality of predictive models;
   obtaining alarm information indicating a value and an operation to perform as a result of the value being within a confidence interval relative to predictions generated using the predictive model; and
   generating a plurality of predictions for the plurality of computing resources by at least:
      obtaining a forecasting interval indicating a point in time for which a prediction is to be generated;
      generating the prediction based at least in part on the predictive model and a second portion of the aggregated metrics data;
      determining the confidence interval based at least in part on the prediction; and
      determining to perform the operation based at least in part on the confidence interval.

2. The computer-implemented method of claim 1, wherein the operation includes transmitting a notification to an entity associated with the plurality of computing resources based at least in part on a severity level indicated by the alarm information.

3. The computer-implemented method of claim 1, wherein the confidence interval indicates a number of standard deviations from a mean relative to the value to trigger the alarm information.

4. The computer-implemented method of claim 1, wherein the aggregated metrics data includes time series data indicating measurements obtained from the plurality of computing resources over an interval of time and aggregated according to an aggregation algorithm.

5. The computer-implemented method of claim 1, wherein the predictive modeling algorithms are usable to determine a seasonality range.

6. A system, comprising:
one or more processors; and
memory comprising computer-executable instructions that, if executed, cause the one or more processors to:
obtain aggregated metrics data indicating operational information of a plurality of computing resources for an interval of time associated with a forecasting interval;
train a plurality of predictive models based at least in part on a plurality of predictive modeling algorithms;
determine a plurality of performance metrics for the plurality of predictive models;
provide, to a customer, a suggestion based at least in part on the plurality of performance metrics, the suggestion indicating a predictive model from the plurality of predictive models;
generate a prediction based at least in part on the predictive model and the aggregated metrics data;
determine a confidence interval based at least in part on the prediction; and
provide an alarm based at least in part on the confidence interval being within a threshold value relative to alarm information.

7. The system of claim 6, wherein the predictive model is selected by a customer from a plurality of predictive models.

8. The system of claim 7, wherein at least one predictive model of the plurality of predictive models includes a Holt-Winters exponential triple smoothing algorithm.

9. The system of claim 6, wherein the memory further stores computer-executable instructions that, if executed, cause the one or more processors to provide to a customer associated with the plurality of computing resources a set of suggested alarms from which the alarm information is selected.

10. The system of claim 6, wherein obtaining the aggregated metrics data further comprises receiving an indication of the plurality of computing resources and the aggregated metrics data to obtain from the plurality of computing resources.

11. The system of claim 6, wherein the confidence interval is determined based at least in part on a Bayesian interval estimate relative to the prediction.

12. The system of claim 6, wherein the aggregated metrics data is unequally divided into training sets.

13. A non-transitory computer-readable storage medium comprising executable instructions that, as a result of being executed by one or more processors of a computer system, cause the computer system to at least:
obtain aggregated metrics data associated with a computing resource of a computing resource service provider and alarm information associated with predictions associated with the computing resource;
train a plurality of predictive models based at least in part on a plurality of predictive modeling algorithms and a first portion of aggregated metrics data;
determine a plurality of performance metrics for the plurality of predictive models;
provide a suggestion to a customer indicating a predictive model, wherein the predictive model is a member of the plurality of predictive models, based at least in part on the plurality of performance metrics;
generate a prediction based at least in part on the predictive model and a second portion of the aggregated metrics data;
calculate a confidence interval based at least in part on the prediction; and
transmit an alarm based at least in part on the confidence interval being within a threshold value relative to the alarm information.

14. The non-transitory computer-readable storage medium of claim 13, wherein the instructions that cause the computer system to generate the predictive model further include instructions that cause the computer system to train the predictive model by at least determining one or more values of a predictive modeling algorithm.

15. The non-transitory computer-readable storage medium of claim 14, wherein the instructions that cause the computer system to train the plurality of predictive models cause the computer system to:
implement a k-fold training algorithm by at least:
dividing the aggregated metrics data into a set of training data;
training the plurality of predictive models based at least in part on a first subset of the set of training data; and
determining a performance metric of the plurality of predictive models based at least in part on the prediction and a second subset of the set of training data.

16. The non-transitory computer-readable storage medium of claim 15, wherein the instructions that cause the computer system to determine the performance metric cause the computer system to determine the alarm information based at least in part on the performance metric.

17. The non-transitory computer-readable storage medium of claim 13, wherein the instructions further comprise instructions that, as a result of being executed by the one or more processors, cause the computer system to update the predictive model after generating the prediction.

18. The non-transitory computer-readable storage medium of claim 13, wherein the instructions further comprise instructions that, as a result of being executed by the one or more processors, cause the computer system to determine a performance metric associated with the predictive model based at least in part on a mean squared error algorithm based at least in part on the prediction and the aggregated metrics data.

19. The non-transitory computer-readable storage medium of claim 13, wherein the instructions that cause the computer system to generate the predictive model cause the computer system to generate the predictive model based at least in part on an autoregressive moving average model.

20. The non-transitory computer-readable storage medium of claim 19, wherein the instructions further comprise instructions that, as a result of being executed by the one or more processors, cause the computer system to determine a smoothing factor, seasonality factor, and a trend factor, of the Holt-Winters exponential triple smoothing algorithm.

\* \* \* \* \*